FIG. I.

United States Patent Office 3,221,298
Patented Nov. 30, 1965

3,221,298
CODED SIGNAL SEISMIC SOURCE
Kay N. Burns, Tulsa, Okla., assignor, by mesne assignments, to Esso Production Research Company, Houston, Tex., a corporation of Delaware
Filed Aug. 27, 1962, Ser. No. 219,405
6 Claims. (Cl. 340—15.5)

This invention relates to the art of seismic prospecting, and more particularly to seismic prospecting techniques wherein elongated wave trains of seismic signals are injected into the earth.

The use of seismic impulses for studying the earth's substrata is well known. In general an artificial seismic disturbance is set up near the earth's surface. A portion of the seismic disturbance travels downwardly until it encounters a subsurface discontinuity such as an interface between two strata and a portion of the energy is reflected back toward the surface of the earth. The reflected seismic waves are detected by means of geophones located at a plurality of detecting stations or locations spaced apart on the earth's surface. By measuring the time intervals between the initiation of the seismic impulses and the reception of the reflected energy at each of the many detection stations it is possible to learn a great deal about the nature and structure of the earth's subsurface. The use of seismic prospecting procedure has found particular application in prospecting for petroleum.

In employing seismic methods in search for oil and gas a widely-used practice consists of drilling a so-called shot hole into which a dynamite charge can be placed and later detonated. A normal shot hole may vary in depth from as shallow as about 50 feet to as deep as about 250 feet. After the shot hole has been drilled and the dynamite placed therein and geophones planted about the area, the dynamite is then detonated. The resulting waves or reflections from subsurface events of the down-travelling energy from the seismic impulses are then detected from the geophones. Electrical output signals from the geophones are simultaneously recorded to form a multi-trace seismogram. In order to determine the depth of a given stratum the two-way travel time of the seismic waves between the earth's surface and the stratum must be measured very exactly. In this method of seismic prospecting all the elastic wave energy is injected into the earth at substantially the same time, and undesired components of the traces of the seismograms may be at least partially eliminated by frequency discrimination.

In another type of seismic prospecting that has found relatively limited use to date, an elongated vibratory seismic signal or wave train is injected into the earth. Preferably, the injected seismic signal is nonrepetitive during a time interval which is substantially longer than the travel time of the signal along the longest travel path of interest. Expressed in another manner, the duration of the signal is at least as long as the travel time of the signal along any of the paths by which it reaches a detecting location at useable energy levels. In the usual case in reflection seismography, the longest travel path of interest will be the shortest path from the seismic wave source to the deepest reflecting horizon which it is desired to delineate and back to the earth's surface at the detecting location farthest removed from the seismic source. Seismic waves produced by the vibratory seismic signal are detected at one or more detecting locations removed from the injecting location. It has been the practice to produce a counterpart electrical replica of the injected signal (i.e., an electrical signal substantially identical to the injected seismic signal) by means of a geophone at the injecting location. This geophone may be either connected to the vibratory source or positioned in the earth near the source. The replica signal is cross correlated with each signal produced at the detecting stations. The cross correlation is carried out at a plurality of time-phase relationships between said each signal and the replica signal. Of the replica signal and each signal cross correlated therewith, the time-phase relationship which yields the greatest value of correlation is used as a measure or parameter of the travel time of the injected signal from the injecting location to the detecting location corresponding to said each signal. Correlation of the replica signal and an electrical signal representative of detected seismic waves typically has been accomplished by initially recording both signals, reproducing the signal as time series, combining the time series and emphasizing amplitude variations in the combined time series, and integrating the resulting signal while shifting the time-phase relationship (or $\tau$) between the reproduced signals with respect to their time-phase relationship as originally recorded. The general method is described in U.S. Patent No. 2,989,726, Crawford et al., and will be recognized as being of the type operating in the time domain.

A form of injected signal that has been widely used in the above-described method is that of a sinusoid which is continuously varied in frequency so as to be nonrepetitive over a desired time interval. The cross correlation curve resulting from a given reflection obtained with such a signal is that of a major lobe flanked by minor lobes diminishing in amplitude and extending from the major lobe in both directions on the $t$ axis of the correlation curve. The side lobes may be of sufficient amplitude to mask all of the lobes of a relatively smaller amplitude correlation signal resulting from a reflection from a relatively poor reflecting horizon located near a good reflecting horizon. A much better type of injected seismic signal is a signal having an amplitude density spectrum given by the formula Sin $X/X$ where X represents frequency over a preselected frequency spectrum. Preferably, this type of seismic signal is formed according to a binary code of maximal length. The term "binary code of maximal length" signifies a binary code which may be represented as a reference time series, which code is formed by operating on a binary code group of N digits according to a predetermined rule of formation such that the code group will repeat itself every $(2^N-1)$ digits, and not before. Expressed in another manner, a binary code group of maximal length is a binary code wherein a binary group of N digits at the beginning thereof is not repeated until the code has $(2^N-1)$ digits therein. For example, if the code group 11111 is used, N will be equal to 5 and $(2^N-1)$ equals 31. A binary code of maximal length can be formed therefrom by starting off with 11111 and setting the next element equal to the sum modulo 2 of the first, second, third, and fifth digits preceding it. The process is repeated for each successive element and the following binary code is obtained:

1111101110001010110100001100100

By applying the above-specified rule of formation, it will be found that after 31 elements, the sequence will repeat. There are other rules of formation that are equally useful in generating these codes. Also it is quite common to use $+1$ and $-1$ rather than $+1$ and 0 in the sequence as the binary representative. If a bit interval T is selected to represent one character of the sequence then $(2^N-1)T$ will be the total time of the maximal length code. For example, if $N=5$ and $T=20$ milliseconds, then the total time will be 620 milliseconds. For a more complete discussion of shift register or null sequence codes of maximal length, reference may be had to the following: "The Synthesis of Linear Sequential Coding Networks" by D. A. Huffman, Proc. Third London Symposium on Information Theory, September 1955; and "Several Binary-Sequence Generators" by N. Zierler, Tech. Rep. 95, Lincoln Laboratory, Massachusetts Institute of Technology, Cambridge, Massachusetts, September 1955.

Injecting a binary code of maximal length into the earth in the form of a seismic signal presupposes that a characteristic of the seismic signal is variable between two distinct conditions. For example, the amplitude may be varied between two magnitudes or the phase may be varied between two phase relationships.

In the past the injected signal usually has been a constant frequency sinusoidal signal of constant amplitude, the phase of which is varied between mutually opposite phase relationships. The phase is varied in accordance with a binary code of maximal length having a time duration at least equal to twice the travel time of seismic waves between the earth's surface and the deepest earth reflecting horizon of interest. At low frequencies (less than about 40 cycles per second), this type of signal produces satisfactory results, but at high frequencies, the results become increasingly less satisfactory. The reason is believed to be that the earth is unable to respond to sudden reversals in the sense or direction of amplitude change such as occurs when a sinusoidal signal is switched between mutually opposed phase relationships. Inspection of the waveform of a sinusoid switched back and forth between opposite phase relationships thereof shows that a cusp or a slope discontinuity is formed at the instant of phase reversal. The inability of the earth to accept such a cusp or slope discontinuity from a signal injected thereinto apparently increases as the frequency of the signal increases. Therefore, the correlation between the injected signal and reflected events in the detected signal materially suffers as the frequency of the injected signal is increased.

In accordance with the present invention, an electrical analog representation of a binary code is formed having a waveform $f(t)$ with substantially zero slope at zero amplitude at points along the analog representative of the beginning and end of a bit of the binary code. Another characteristic of the waveform $f(t)$ is that that portion of the electric analog which is representative of a binary bit has the same positive area as negative area. In other words, that portion of the electric analog representing a binary bit has no D.C. component. That is $$\int_0^T f(t)\,dt = 0$$

where T is the bit interval time. An electrical signal is thus formed using this electrical analog as a carrier, wherein the carrier is modulated in accordance with the binary code of maximal length.

In a preferred embodiment for obtaining the electrical analog representative of the binary code, there is provided an electrical code generator for producing an output signal having a characteristic variable between an amplitude of one polarity and an equal amplitude of the other polarity in accordance with the binary code. The binary code is composed of equal duration bits or intervals. Means are provided to provide a pulse to the electric code generator at the beginning of each bit. The output of such generator, during the time interval representing the binary bit, is a voltage level of the polarity representing that bit. Second generating means are provided for generating a carrier signal which oscillates back and forth from a positive to a negative value and which signal has the first and second derivatives equal zero at the beginning or end of the bit interval. The period of this carrier signal is the same as the duration or interval of the bit. Means are provided to multiply the output of the code generating means by the carrier signal to obtain a drive signal. The drive signal is characterized in that there are no cusps and that during any interval representing a bit duration there is the same area under the positive portion of the drive signal as there is under the negative portion. The importance of this will become more apparent hereinafter.

Objects and features of the invention not apparent from the above discussion will become evident upon consideration of the following detailed description thereof taken in conjunction with the accompanying drawing, wherein.

Figure 1:
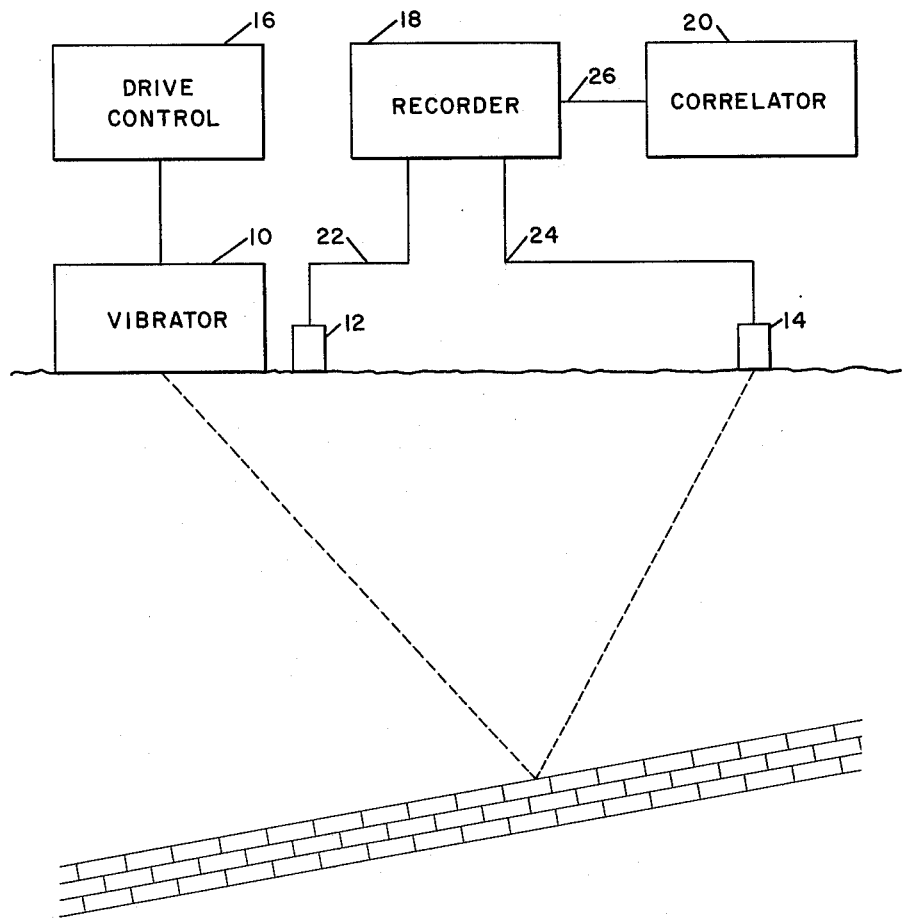
FIG. 1 is a schematic drawing of apparatus carrying out a seismic observation in accordance with the invention.

Referring now to FIG. 1, there is shown placed on the earth's surface a vibrator 10 and a geophone 12 positioned at a transmitting location on the earth's surface. A reflection geophone 14 is positioned at a detecting location remote from the transmitting location. Of course, as is well known, a plurality of geophones spaced in any array can be used at the detecting location rather than a single geophone. The function of geophone 12 is to produce an electrical counterpart or replica of the signal transmitted into the earth by vibrator 10. The vibrator 10 may be any of a number of types of vibrators well known in the art which are capable of faithfully following a drive signal. The vibrator 10 is preferably an electrohydraulic vibrator such as is manufactured by the M. B. Electronics Company of New Haven, Connecticut, and by the Ling Electronics Company of Anaheim, California. Such vibrators utilize a hydraulically actuated piston to vibrate an object and to control the hydraulic force on the piston in accordance with variations in the amplitude of a relatively small analog electrical signal which is connected thereto and is used as the drive or control signal.

Figure 2:
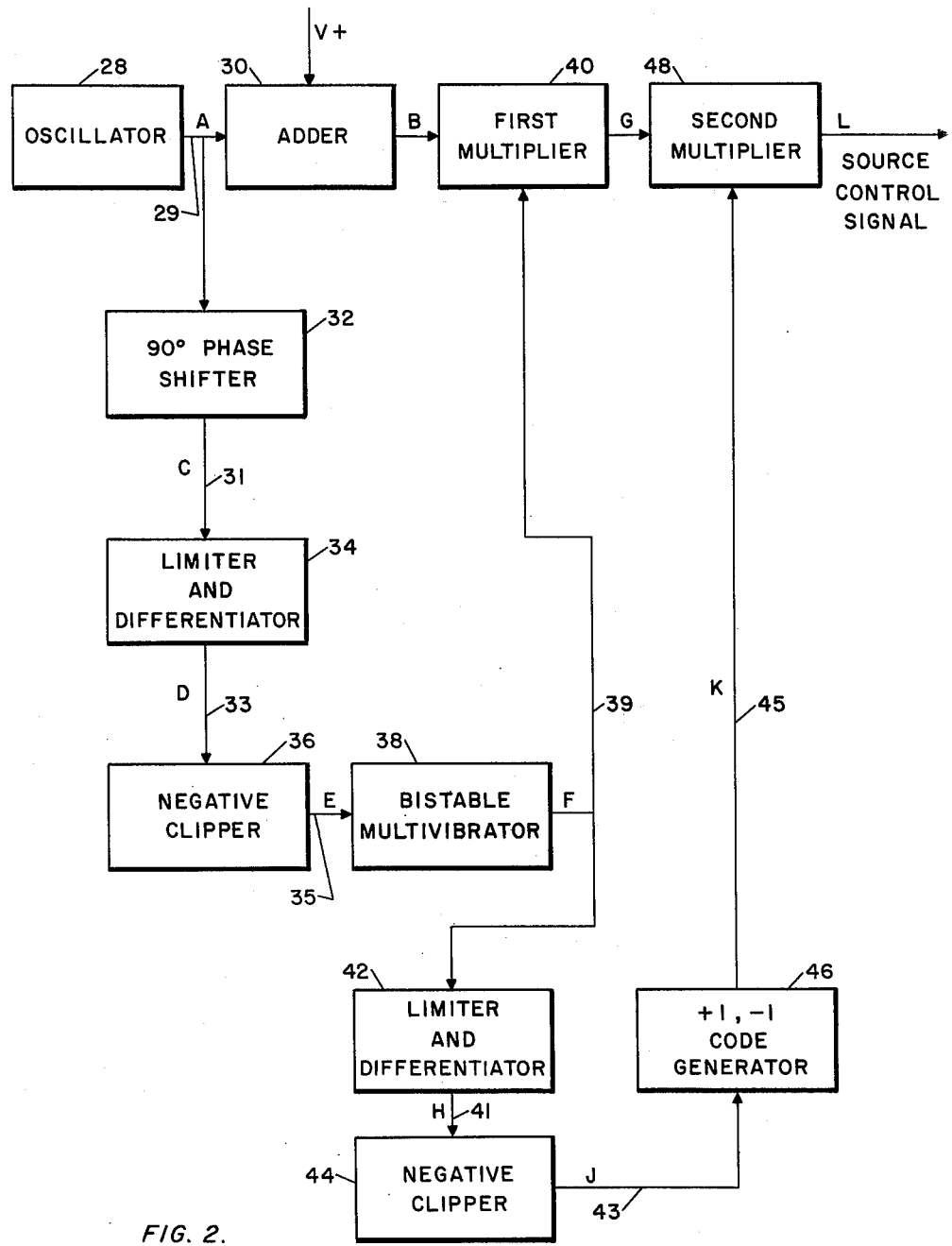
FIG. 2 is a diagram of apparatus for obtaining a drive signal.

Vibrator 10 is coupled to a vibratory control or drive unit 16. The control unit may be an apparatus such as illustrated in FIG. 2 and described hereinafter, or it may be a magnetic tape reproducing unit. In the latter case, the apparatus of FIG. 2 may be used to prerecord on the magnetic tape an electrical signal having the waveform described below so that the resulting signal can be repetitively reproduced by the magnetic tape reproducing unit to perform a plurality of seismic observations.

The electrical output signals to geophone 10 is fed through conductor 22 to a recording head, not shown, on recorder 18 so that it can be recorded independently. Likewise, the electrical output signal from geophone 14 is fed through circuit 24 to another head of recorder 18 where that signal is recorded independently. Recorder 18 can be a magnetic tape recorder or the type of apparatus well known to the art adapted to record and subsequently reproduce electrical signals therefrom. Reproduced signals from recorder 18 are fed through circuit 26 to an electrical correlator 20. The correlator 20 can be of the type described in U.S. Patent No. 2,927,656, Feagin et al. The function of correlator 20 is to provide an output signal or recordation indicative of the cross correlation between the electrical signals produced by geophones 12 and 14 at a multiplicity of time-phase relationships therewith.

Figure 3:
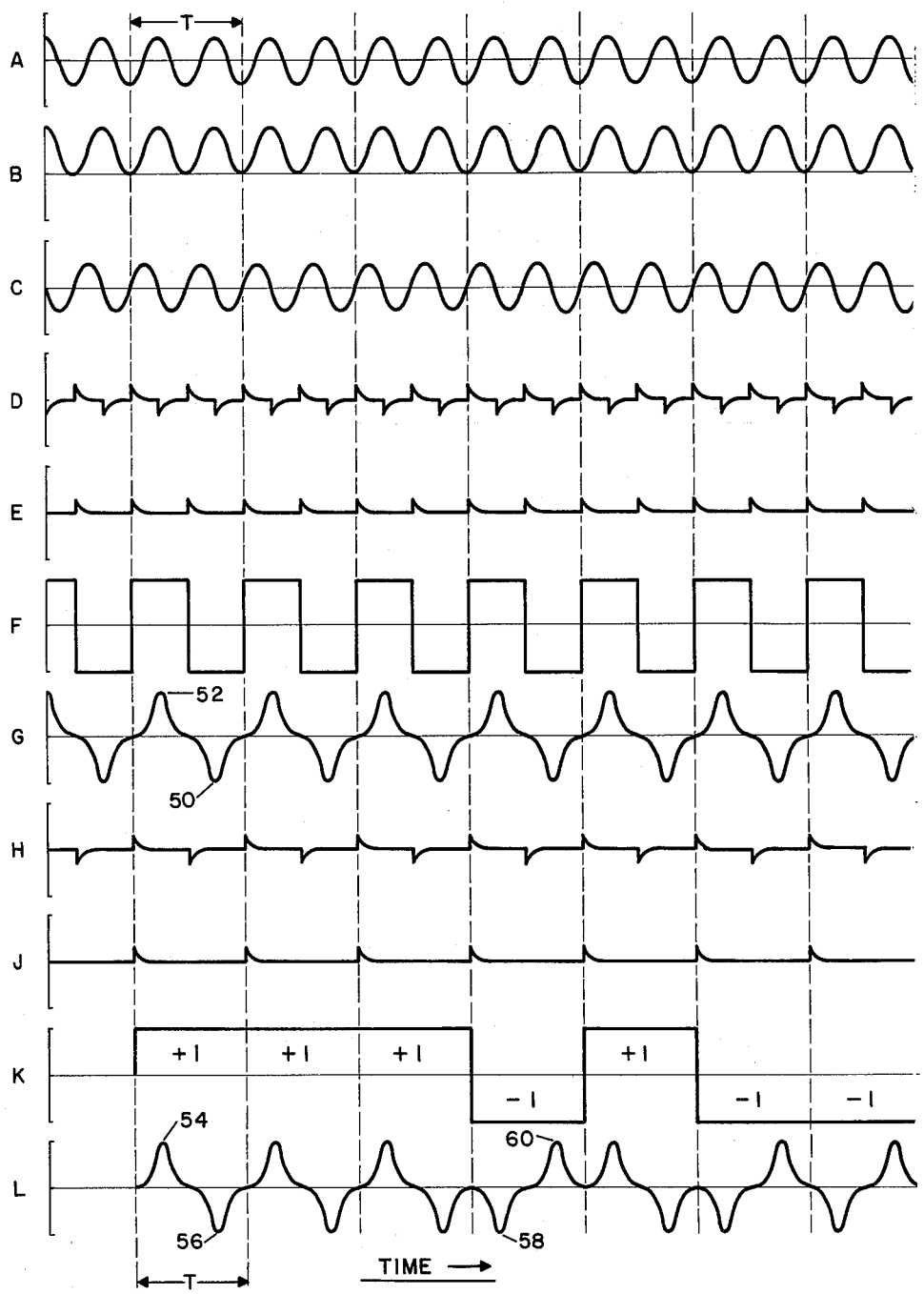
FIG. 3 illustrates waveforms obtained at various points in the apparatus of FIG. 2.

Turning now to FIG. 2, there is illustrated the best mode contemplated for generating the control drive signal of this invention. Illustrated thereon is an oscillator 28 of a character to have an output signal described as ½ cos $2w_0 t$ and which is illustrated as waveform A in FIG. 3. The output of oscillator 28 is connected through lead 29 to adder 30 and to phase shifter 32. Also fed to adder 30 is a positive D.-C. voltage having an amplitude equal to ½ the peak-to-valley amplitude of the oscillating signal from oscillator 28. The output from adder 30 is therefore $\cos^2 w_0 t$ which is equivalent to $\frac{1}{2} + \frac{1}{2} \cos 2w_0 t$. This is illustrated on FIG. 3 as waveform B. For convenience the letter identifying the various waveforms in FIG. 3 appears in FIG. 2 at the point where that particular waveform occurs. As can be seen from the drawing of FIG. 3, waveform B is quite similar to waveform A except that all values of the waveform are positive, that is there are no waves below the zero line.

The output of oscillator 28 is also fed to a 90° phase shifter 32. Waveform C, which represents the output of phase shifter 32, is essentially identical to the output of oscillator 28 except that it has been shifted 90° to the left or 90° out of phase. Waveform C, which is the output of phase shifter 32, is fed through lead 31 to limiter and differentiator 34. Limiters and differentiators are well known in the art and the limiter and differentiator 34 acts upon the input signal fed thereto to have an output pulse or spike at each zero crossing of the input signal. This output signal is illustrated at waveform D in FIG. 3. The output of limiter and differentiator circuit 34 is fed through lead 33 to negative clipper 36. Negative clipper 36 is of a character to remove the negative spikes or portion of the waveform D which is fed thereto. Its output then is illustrated as waveform E which has only positive spikes.

The output of negative clipper 36 is fed through lead 35 to a bistable multivibrator 38 which, as is well known, is a circuit with two stable states which requires a trigger pulse to shift from one state to the other. Thus upon each pulse of waveform E, the bistable multivibrator shifts states. The output of multivibrator 38 is illustrated as waveform F. The waveform F is fed through lead 39 to a first multiplier 40. Multiplier 40 multiplies waveform B times waveform F and obtains an output which is illustrated as waveform G in FIG. 3. It will be noted that the waveform G has no cusps at the zero value thereof. Stated differently, both the first and second derivative of waveform G are simultaneously zero at the beginning or end of the bit interval where the waveform changes polarity.

The output F of multivibrator 38 is also fed to a limiter and differentiator circuit 42 which is similar to circuit 34. The output of limiter and differentiator 42 is illustrated as waveform H which is a series of spikes for each change of polarity of waveform F. The waveform H is fed through lead 41 to a negative clipper 44 which similarly as negative clipper 36 removes the negative pulses of waveform H to give a waveform J which has only positive pulses. The positive pulses of waveform J are fed through lead 43 to a code generator 46. Code generator 46 is a circuit means which produces an output signal variable between two amplitudes in accordance with a binary code of maximal length. Suitable apparatus for this purpose is described in an article entitled "Shift Registers" by P. H. R. Scholefield appearing in the periodical Electronic Technology, October 1960, page 389. The output signal of code generator 46 is illustrated as waveform K in FIG. 3 and is a signal variable between a positive level of unity and a negative level of unity. The code generator is pulsed by each pulse of waveform J and for a positive or plus 1 binary bit the output is a positive constant value for an interval equivalent to the length of the binary bit. If, upon receiving a pulse from waveform J the code generator has information indicating a binary bit of minus 1, then the output has a constant negative output for the duration of that binary bit. Thus, it is seen that the input signal of J tells the code generator when to begin a binary bit and information stored in the generator controls whether the output for that binary interval is a positive or a negative polarity of constant amplitude. The output of code generator 46 is illustrated as waveform K and, as is shown there, the binary bits of the same polarity can succeed each other to obtain any desired binary code. It will be noted further that if each binary bit has an interval of time T, then the output A of oscillator 28 should complete two cycles in the time T.

The output K of code generator 46 is fed through lead 45 to a second multiplier 48. In that multiplier, waveform K is multiplied by waveform G. It will be observed that waveform G has first a peak and then a valley, never a peak succeeding a peak or a valley succeeding a valley. By valley it is meant, for example, point 50, and by peak it is meant, for example, point 52. The output of multiplier 48 is the desired drive signal L. It will be observed that for each interval of waveform L which represents in time a binary bit, that there is a peak and a valley having equal areas or giving a D.C. value of 0 for the interval. This is made possible by obtaining the resultant carrier waveform G, which as shown above alternates from having a peak and then a valley for each interval of time representative of a binary bit interval.

In the particular embodiment shown it can be seen that for a binary bit of plus 1, that during that particular interval in waveform L, a plus or peak 54 is followed by a valley 56. If the binary bit is a negative value, then the order is reversed, that is valley 58 precedes peak 60. Therefore, the voltage represented by the waveform L which is the output of multiplier 48 is in accordance with the binary code produced by code generator 46. As can readily be seen, the waveform is of zero slope at zero amplitude and has no cusps at the instances at which it is of zero amplitude. In effect, the waveform of each binary bit is represented by the formula $$f(t) = \cos^2 w_0 t \text{ for } 0 < w_0 t < \pi$$

and $f(t) = -\cos^2 w_0 t$ for $\pi < wt < 2\pi$. As shown above, the apparatus of FIG. 2 can be used either to drive vibrator 10 directly or to record on magnetic tape or to trace a record in accordance with the signal appearing from multiplier 48. In any event the output signal produced by the apparatus of FIG. 2 will be used to drive vibrator 10. As indicated earlier, it is preferred that vibrator 10 be an electrohydraulic vibrator. The waveforms selected in the above description were based on methods of circuit design which use sinusoids to develop the carrier. Other equally useful carriers satisfying the area requirement set out above and the slope requirements at the interval changeover could be used.

As an example in an electrohydraulic vibrator a radiating plate is placed upon the ground. A reaction mass is supported from the radiating plate by springs which exert a static force on the radiating plates. A vertical cylinder is supported from the reaction mass, and mounted within the cylinder is a hydraulic piston. The hydraulic piston is connected to the radiating plate. An electrodynamic drive or control means controls the force of hydraulic fluid on the area of the hydraulic piston in accordance with the analog control signal fed thereto. When the driving signal is of one polarity, the force of the hydraulic piston area is in one direction; when the drive signal is of the other polarity, the force of the hydraulic fluid on the piston area is in the other direction. Thus, the "stroke" of the hydraulic piston must be sufficient to accommodate the D.C. component of the drive signal. If a regular binary code is used, there is little control on the duration of one polarity of the drive signal. Then it is seen that the effective "stroke" of the hydraulic piston must be made rather great in such a system. However, this is no problem at all in the present system, as in applicant's system in any interval for a binary bit, the drive signal is such that the area under the negative portion is equal to the area under the positive portion of the signal. Further, in the entire drive signal there is never more than two successive peaks of the pulses or two successive valleys. Thus it is assured that a long series of one polarity never builds up. This means that the total area of the drive signal over a time shorter than the total code length will be limited to useable values.

While there are above disclosed but a preferred embodiment of the structure of the invention herein presented, it is possible to produce still other embodiments without departing from the inventive concept herein disclosed. It is therefore desired that only such limitations be imposed on the appended claims as are stated therein.

What is claimed is:

1. A system for generating a drive signal for a vibrator for imparting a seismic input code into the earth which comprises the following elements:
    (a) First generating means for generating a signal which is defined as $\cos^2 \omega_0 t$;
    (b) A bistable multivibrator means having two stable states which changes from one state to the next at each minimum value of each signal generated in element (a);
    (c) A code generator for generating a binary code;
    (d) means connecting the output of said bi-stable multivibrator means to said code generator, said means including a limiter and differentiator circuit and a clipper of one polarity, each pulse from such clipper initiating a binary bit in said code generator;
    (e) First multiplier means for multiplying the output signal of element (a) times the output signal of element (b);
    (f) Second multiplier means to multiply the output of said code generator means by the output of said first multiplier means.

2. In the method of measuring the travel time along at least one path of propagation through the earth between spaced apart first and second points on the earth of a vibratory signal which is nonrepetitive during time intervals substantially longer than the travel time of said signal along any of those paths in its propagation through the earth by which it reaches said second point at useable energy levels, and wherein is produced an electrical replica of the signal as transmitted and an electrical signal representative of the vibratory signal as received at said second point, and wherein the electrical replica of the signal as transmitted and an electrical signal representative of the vibratory signal as received at said second point or cross correlated with a multiplicity of time phase relationships therebetween, the improvement which comprises:

Producing a binary code of maximal length wherein a code group of N binary bits is not repeated for $(2^N-1)$ bits;

Generating a carrier signal which oscillates back and forth from a positive to a negative value, the interval of a period of such carrier signal corresponding to the binary bit of said binary code, the carrier signal having substantially zero slope at the beginning and end of such interval and being completely continuous therebetween;

Multiplying the carrier signal by the binary code to form a drive control signal; and, Forming said vibratory seismic signal by driving an electro acoustical transducer with said resulting drive control signal.

3. An apparatus for generating a drive signal which comprises in combination: an oscillator whose output is defined as $\frac{1}{2} \cos 2 \omega_0 t$; a positive D.-C. voltage source whose amplitude is equal to the maximum negative amplitude of the output signal of said oscillator; an adder to which is connected to the output of said oscillator and the D.-C. voltage; a phase shifter connected to the output of said oscillator and of a character to shift the phase 90°; a limiter and differentiator circuit connected to the output of said phase shifter and of a character to have a sharp pulse at each zero crossing of the output of said phase shifter; a negative clipper connected to the output of said limiter and differentiator circuit and of a character to remove the negative pulses of the signal fed thereto; a bistable multivibrator electrically connected to the output of said negative clipper and having two stable states which switches from one such state to the other state upon receiving a trigger pulse from said negative clipper; a first multiplier electrically connected to the output of said bistable multivibrator and the output of said adder and of a character to multiply the two input signals; a second limiter and differentiator circuit electrically connected to the output of said bistable multivibrator and of a character to have an output pulse upon the change of polarity of the signal from the bistable multivibrator; a negative clipper connected to the output of said second limiter and differentiator and of a character to remove the negative pulses therefrom; a code generator means connected to the output of said negative clipper and of a character to start a new binary bit upon receipt of a pulse from the output of said negative clipper; a second multiplier for multiplying the output of said code generator and said first multiplier, the output of said second multiplier being the drive control signal.

4. A system for generating a drive signal for a vibrator for imparting a seismic input code into the ground which comprises in combination:
    (a) an oscillator having an oscillating output signal defined by $\frac{1}{2} \cos 2\omega_0 t$;
    (b) means responsive to the output of said oscillator for generating a signal defined $\cos^2 \omega_0 t$;
    (c) means responsive to the output of said oscillator for obtaining a rectangular function whose polarity changes at alternating zero values of the output signal of the oscillator;
    (d) means for multiplying the signal generated by (b) means by the signal generated by (c) means;
    (e) code generator means for generating a preselected code having bit intervals which is substantially a rectangular waveform, such code having positive levels and negative levels in which the length of each level is indicative of a code;
    (f) means connected to and responsive to the output of means (c) for pulsing said code generator means at alternating changes of sign of the signal of means (c); and
    (g) second multiplying means to multiply the output of element (c) by the output of said code generator.

5. A system for generating a seismic drive signal for a vibrator for imparting a seismic input code into the ground which comprises the following elements:
    (a) electric code generator means for producing a rectangular wave output signal having a characteristic variable between a positive amplitude and a negative amplitude in accordance with a multibit binary code;
    (b) oscillator means having an output signal which oscillates back and forth from a positive to a negative value;
    (c) means connected to said oscillator means and responsive to the output signal of said oscillator means to generate a carrier signal which oscillates back and forth from a positive to a negative value, said carrier signal having a waveform alternately variable between a given amplitude of one polarity and a given amplitude of the opposite polarity, said waveform having substantially zero slope at an interval end point;
    (d) synchronizing means connected to said code generator means, and responsive to and connected to the output of said element (c) for coinciding the bit duration of the binary code signal produced by element (a) with the period of the carrier signal; and
    (e) means connected to element (a) and to element (c) to multiply the output signal of element (a) with the output signal of element (c).

6. A system for generating a seismic drive signal which comprises the following elements:
    (a) a code generating means for generating a multibit binary code output signal having bit intervals of equal duration which is substantially a rectangular waveform, such waveform having positive levels and negative levels, the polarity of the level being indicative of bit information for that interval;

(b) means to generate a carrier output signal which oscillates back and forth from a positive to a negative value and whose first and second derivatives equal zero at the beginning and end of the bit interval;

(c) synchronizing means connected to said element (a) and said element (b) to synchronize the bit intervals of said element (a) with the period of the output signal of element (b); and (d) means connected to said element (a) and to said element (b) for multiplying the output signals of element (a) with the output signals of element (b).

References Cited by the Examiner

UNITED STATES PATENTS

| | | | |
|---|---|---|---|
| 2,958,039 | 10/1960 | Anderson | 340—15.5 |
| 2,968,022 | 1/1961 | Unterberger | 340—15.5 |
| 3,020,970 | 2/1962 | Hasbrook | 181—.5 X |
| 3,046,545 | 7/1962 | Westerfield | 343—5 |
| 3,063,034 | 11/1962 | Lee | 340—15.5 |
| 3,099,796 | 7/1963 | Zadoff | 325—145 |
| 3,108,249 | 10/1963 | Clement | 340—15.5 |
| 3,117,305 | 1/1964 | Goldberg | 325—30 |

BENJAMIN A. BORCHELT, *Primary Examiner.*

CHESTER L. JUSTUS, SAMUEL FEINBERG,
*Examiners.*